United States Patent
Hassani et al.

(10) Patent No.: US 11,776,323 B2
(45) Date of Patent: Oct. 3, 2023

(54) BIOMETRIC TASK NETWORK

(71) Applicant: Ford Global Technologies, LLC, Dearborn, MI (US)

(72) Inventors: Ali Hassani, Ann Arbor, MI (US); Justin Miller, Berkley, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 57 days.

(21) Appl. No.: 17/730,324

(22) Filed: Apr. 27, 2022

(65) Prior Publication Data
US 2023/0260329 A1    Aug. 17, 2023

Related U.S. Application Data

(60) Provisional application No. 63/310,401, filed on Feb. 15, 2022.

(51) Int. Cl.
*G06V 40/40* (2022.01)
*G06V 10/82* (2022.01)
*G06V 40/16* (2022.01)

(52) U.S. Cl.
CPC .............. *G06V 40/45* (2022.01); *G06V 10/82* (2022.01); *G06V 40/161* (2022.01)

(58) Field of Classification Search
None
See application file for complete search history.

(56) References Cited

U.S. PATENT DOCUMENTS

| | | |
|---|---|---|
| 7,797,803 B2 | 9/2010 | Falb et al. |
| 10,179,563 B2 | 1/2019 | Ammons |

(Continued)

FOREIGN PATENT DOCUMENTS

| | | |
|---|---|---|
| CN | 106529402 B | 5/2019 |
| CN | 110930982 A | 3/2020 |

(Continued)

OTHER PUBLICATIONS

T. Devries, K. Biswaranjan and G. W. Taylor, "Multi-task Learning of Facial Landmarks and Expression," 2014 Canadian Conference on Computer and Robot Vision, 2014, pp. 98-103, doi: 10.1109/CRV.2014.21.

*Primary Examiner* — Bernard Krasnic
(74) *Attorney, Agent, or Firm* — Frank Lollo; Bejin Bieneman PLC

(57) ABSTRACT

A liveliness prediction output is provided from a liveliness biometric analysis task that is determined by a deep neural network based on an image provided from an image sensor wherein the liveliness biometric analysis task is performed in a deep neural network that includes a common feature extraction neural network and a plurality of task-specific neural networks including a face detection neural network, a body pose neural network and a liveliness neural network including a region of interest (ROI) detection neural network and a texture analysis neural network to determine the liveliness biometric analysis task by inputting the image to the common feature extraction neural network to determine latent variables. The latent variables can be input to the face detection neural network and the liveliness neural network. Output from the face detection neural network can be input to the ROI detection neural network.

20 Claims, 6 Drawing Sheets

(56) References Cited

U.S. PATENT DOCUMENTS

| | | | |
|---|---|---|---|
| 10,747,989 B2 | 8/2020 | Zou et al. | |
| 10,860,837 B2 | 12/2020 | Ranjan et al. | |
| 2018/0060648 A1* | 3/2018 | Yoo | G06V 40/168 |
| 2020/0210688 A1 | 7/2020 | Xu | |
| 2021/0117984 A1* | 4/2021 | Sharma | G06T 7/001 |
| 2021/0150240 A1 | 5/2021 | Yu et al. | |
| 2023/0063229 A1* | 3/2023 | Vemulapalli | G06V 40/172 |
| 2023/0206700 A1* | 6/2023 | Khan | G06V 40/168 |
| | | | 382/116 |

FOREIGN PATENT DOCUMENTS

| | | |
|---|---|---|
| CN | 111539480 A | 8/2020 |
| CN | 110659744 B | 6/2021 |
| KR | 101579288 B1 | 12/2015 |
| WO | 2016026063 A1 | 2/2016 |
| WO | WO-2022003107 A1 * | 1/2022 |

* cited by examiner

US 11,776,323 B2

BIOMETRIC TASK NETWORK

CROSS-REFERENCE TO RELATED APPLICATION

This patent application claims priority to U.S. Provisional Patent Application No. 63/310,401 filed on Feb. 15, 2022, which is hereby incorporated by reference in its entirety.

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more image sensors that can be processed to determine data regarding objects. Data extracted from images of objects can be used by a computer to operate systems including vehicles, robots, security systems, and/or object tracking systems.

DETAILED DESCRIPTION

Figure 1:
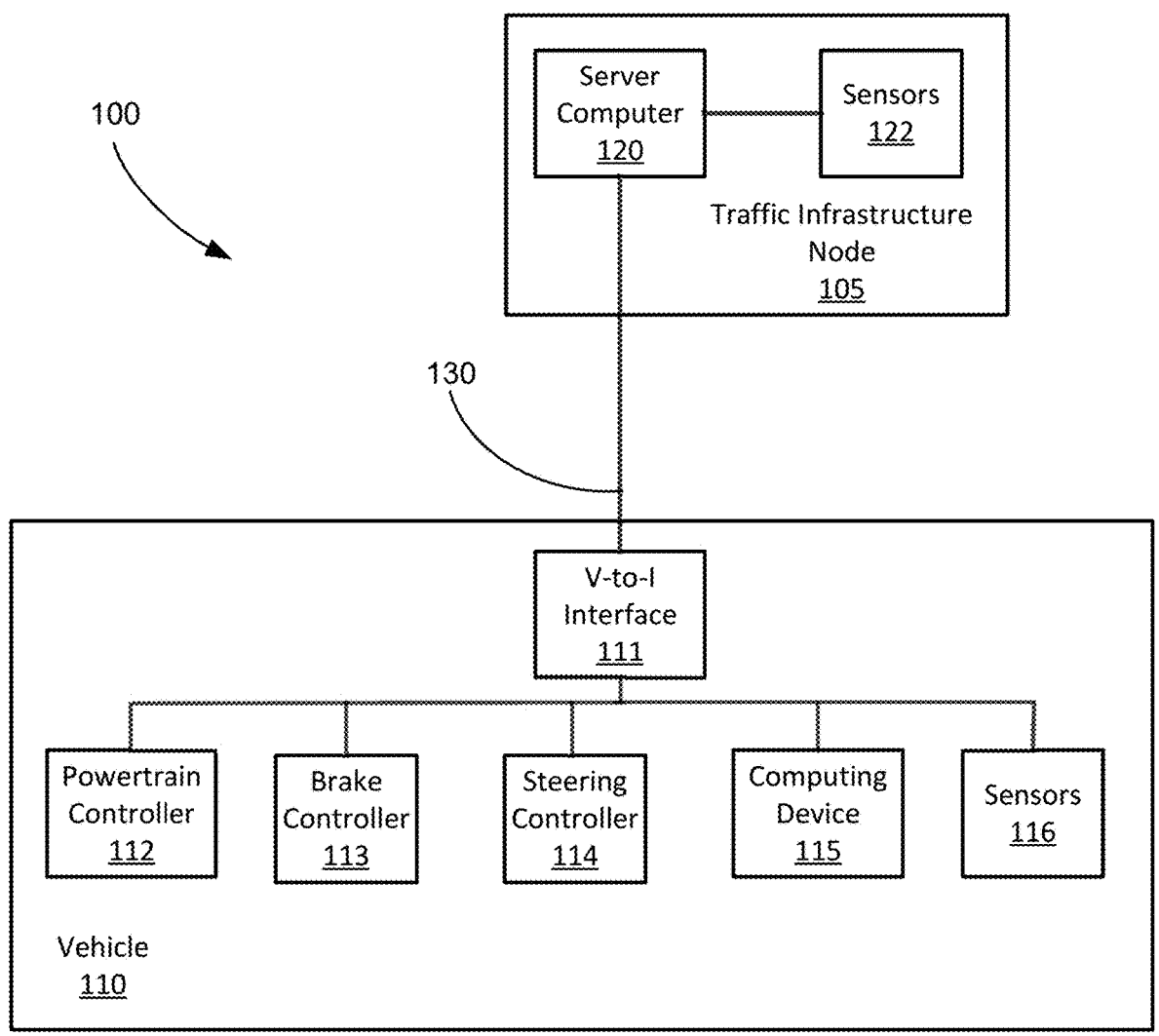
FIG. 1 is a block diagram of an example traffic infrastructure system.

Biometric analysis can be implemented in a computer to determine data regarding objects, for example potential users, in or around a system or machine, such as a vehicle. Based on data determined from biometric analysis a vehicle, for example, can be operated. Biometric analysis herein means measuring or calculating data regarding a user based on physical characteristics of the user. For example, a computing device in a vehicle or traffic infrastructure system can be programmed to acquire one or more images from one or more sensors included in the vehicle or the traffic infrastructure system and grant permission for a user to operate the vehicle based on biometric data determined based on the images. This granting of permission is referred to herein as biometric identification. Biometric identification means determining the identity of a potential user. The determined identity of a user can be logged to keep track of which user is accessing a vehicle and/or compared to a list of authorized users to authenticate a user prior to granting permission to the user to operate a vehicle or system. Biometric analysis includes determining one or more physical characteristics such as user drowsiness, gaze direction, user pose, user liveliness, etc. Biometric analysis tasks can be applied to other machines or systems in addition to vehicles. For example, a computer system, a robot system, a manufacturing system, and a security system can require that a potential user be identified using an acquired image before granting access to the system or a secure area.

Advantageously, techniques described herein can enhance the ability of a computing device, e.g., in a traffic infrastructure system and/or a vehicle as discussed further below, to perform biometric analysis based on a recognition that facial biometric algorithms such as facial feature identification include redundant tasks across different applications. Further, some facial biometric algorithms have sparse or limited training datasets. Techniques described herein include a multi-task network that includes a common feature identification neural network and a plurality of biometric analysis task neural networks. A deep neural network is configured to include a common feature extraction neural network as a "backbone" and a plurality of biometric analysis task neural networks that receive as input a common set of latent variables generated by the common feature extraction neural network. The deep neural network includes a plurality of expert pooling deep neural networks that enhance training of the deep neural network by sharing results between the plurality of biometric analysis tasks.

A method is disclosed herein, including providing a liveliness prediction output from a liveliness biometric analysis task that is determined by a deep neural network based on an image provided from an image sensor wherein the liveliness biometric analysis task is performed in a deep neural network that includes a common feature extraction neural network and a plurality of task-specific neural networks including a face detection neural network, a body pose neural network and a liveliness neural network including a region of interest (ROI) detection neural network and a texture analysis neural network to determine the liveliness biometric analysis task by inputting the image to the common feature extraction neural network to determine latent variables. The latent variables can be input to the face detection neural network and the liveliness neural network. Output from the face detection neural network can be input to the ROI detection neural network. Output from the ROI detection neural network can be input to the texture analysis neural network. Output from the texture analysis neural network can be input to a liveliness expert pooling neural network to determine the liveliness prediction and the liveliness prediction can be output. The deep neural network can be trained by combining output from the texture analysis neural network and the body pose neural network in the liveliness expert pooling neural network to determine the liveliness prediction. A device can be operated based on the liveliness prediction output from the deep neural network. The device can be operated based on the liveliness prediction including determining user authentication. The common feature extraction neural network can include a plurality of convolutional layers.

The plurality of task-specific neural networks can include a plurality of fully connected layers. The outputs from the face detection neural network and the body pose neural network can be input to SoftMax functions. Output from the liveliness expert pooling neural network can be input to a SoftMax functions. The deep neural network can be trained by determining first loss functions based on the outputs from the face detection neural network and the body pose neural networks, determining a second loss function based on outputs from the liveliness expert pooling neural network, determining a joint loss function based on combining the first loss functions with the second loss function and backpropagating the joint loss function back through the deep neural network to determine deep neural network weights. The deep neural network is trained by processing a training dataset of images including ground truth a plurality of times and determining weights based on minimizing the joint loss function. One or more outputs from the plurality of task-specific neural networks can be set to zero during training. Weights included in the plurality of task-specific neural networks can be frozen during training. The deep neural network can be trained based on a loss function determined based on sparse-categorical-cross-entropy statistics. The deep neural network can be trained based on a loss function determined based on mean-square-error statistics.

Further disclosed is a computer readable medium, storing program instructions for executing some or all of the above method steps. Further disclosed is a computer programmed for executing some or all of the above method steps, including a computer apparatus, programmed to provide a liveliness prediction output from a liveliness biometric analysis task that is determined by a deep neural network based on an image provided from an image sensor wherein the liveliness biometric analysis task is performed in a deep neural network that includes a common feature extraction neural network and a plurality of task-specific neural networks including a face detection neural network, a body pose neural network and a liveliness neural network including a region of interest (ROI) detection neural network and a texture analysis neural network to determine the liveliness biometric analysis task by inputting the image to the common feature extraction neural network to determine latent variables. The latent variables can be input to the face detection neural network and the liveliness neural network. Output from the face detection neural network can be input to the ROI detection neural network. Output from the ROI detection neural network can be input to the texture analysis neural network. Output from the texture analysis neural network can be input to a liveliness expert pooling neural network to determine the liveliness prediction and the liveliness prediction can be output. The deep neural network can be trained by combining output from the texture analysis neural network and the body pose neural network in the liveliness expert pooling neural network to determine the liveliness prediction. A device can be operated based on the liveliness prediction output from the deep neural network. The device can be operated based on the liveliness prediction including determining user authentication. The common feature extraction neural network can include a plurality of convolutional layers.

The instructions can include further instructions wherein the plurality of task-specific neural networks can include a plurality of fully connected layers. The outputs from the face detection neural network and the body pose neural network can be input to SoftMax functions. Output from the liveliness expert pooling neural network can be input to a SoftMax functions. The deep neural network can be trained by determining first loss functions based on the outputs from the face detection neural network and the body pose neural networks, determining a second loss function based on outputs from the liveliness expert pooling neural network, determining a joint loss function based on combining the first loss functions with the second loss function and back-propagating the joint loss function back through the deep neural network to determine deep neural network weights. The deep neural network is trained by processing a training dataset of images including ground truth a plurality of times and determining weights based on minimizing the joint loss function. One or more outputs from the plurality of task-specific neural networks can be set to zero during training. Weights included in the plurality of task-specific neural networks can be frozen during training. The deep neural network can be trained based on a loss function determined based on sparse-categorical-cross-entropy statistics. The deep neural network can be trained based on a loss function determined based on mean-square-error statistics.

FIG. 1 is a diagram of a sensing system 100 that can include a traffic infrastructure node 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a powertrain controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, i.e., cellular, BLUETOOTH® and wired and/or wireless packet networks. Computing device 115 may be configured for communicating with other vehicles 110 through V-to-I interface 111 using vehicle-to-vehicle (V-to-V) networks, i.e., according to Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (i.e., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

A traffic infrastructure node 105 can include a physical structure such as a tower or other support structure (i.e., a pole, a box mountable to a bridge support, cell phone tower, road sign support, etc.) on which infrastructure sensors 122, as well as server computer 120 can be mounted, stored, and/or contained, and powered, etc. One traffic infrastructure node 105 is shown in FIG. 1 for ease of illustration, but the system 100 could and likely would include tens, hundreds, or thousands of traffic infrastructure nodes 105. The traffic infrastructure node 105 is typically stationary, i.e., fixed to and not able to move from a specific geographic location. The infrastructure sensors 122 may include one or more sensors such as described above for the vehicle 110 sensors 116, i.e., lidar, radar, cameras, ultrasonic sensors, etc. The infrastructure sensors 122 are fixed or stationary. That is, each sensor 122 is mounted to the infrastructure node so as to have a substantially unmoving and unchanging field of view.

Server computer 120 typically has features in common with the vehicle 110 V-to-I interface 111 and computing device 115, and therefore will not be described further to avoid redundancy. Although not shown for ease of illustration, the traffic infrastructure node 105 also includes a power source such as a battery, solar power cells, and/or a connection to a power grid. A traffic infrastructure node 105 server computer 120 and/or vehicle 110 computing device 115 can receive sensor 116, 122 data to monitor one or more objects. An "object," in the context of this disclosure, is a physical, i.e., material, structure detected by a vehicle sensor 116 and/or infrastructure sensor 122. An object may be a biological object such as a human. A server computer 120 and/or computing device 115 can perform biometric analysis on object data acquired by a sensor 116/122.

Figure 2:
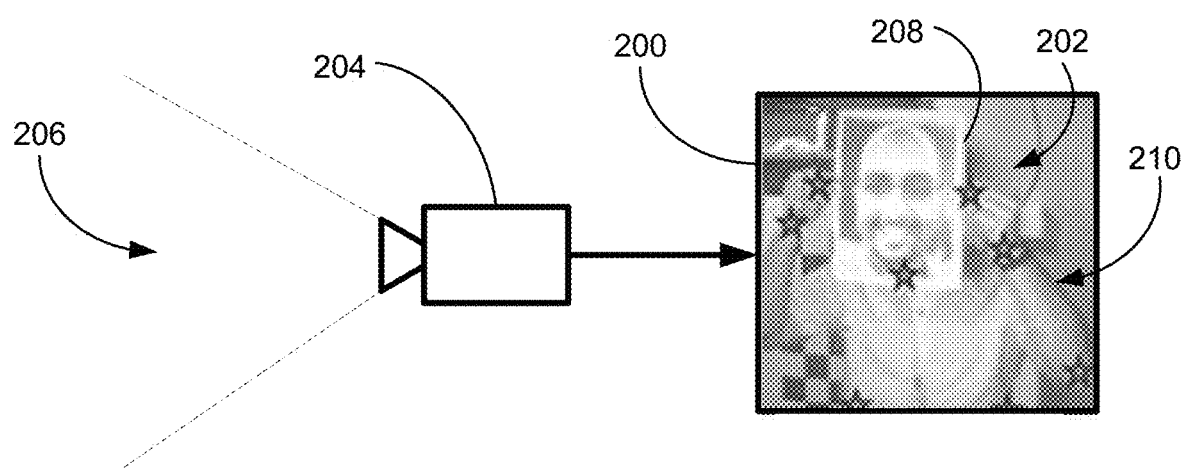
FIG. 2 is a diagram of an example biometric image.

FIG. 2 is a diagram of an image acquisition system 200 included in a vehicle 110 or traffic infrastructure node 105. Image 200 can be acquired by a camera 204, which can be a sensor 116, 122, having a field of view 208. The image 200 can be acquired when a user approaches a vehicle 110, for example. A computing device 115 in the vehicle 110 or a server computer 120 can execute a biometric analysis task that authenticates the user and grants permission to the user to operate the vehicle 110, i.e., unlocks a door to permit the user to enter the vehicle 110. In addition to biometric identification, spoof detection biometric analysis tasks such as liveliness detection can be used to determine whether the image data presented for user identification is a real image of a real user, i.e., not a photograph of a user or not a mask of a user.

Image 200 includes a user 202. Field of view 208 of camera 204 is configured to include portions of the user's body in addition to the user's face. In image 200 the user 202 is holding up a photograph of a person's face to attempt to spoof a biometric identification system into authorizing them to operate a device. Image 200 includes a plurality of points indicated by stars 210 indicating pose features determined by a pose detection biometric analysis task. The pose features can be determined by any suitable body pose biometric analysis task. The body pose features include the locations of skeletal joints including wrist joints, elbow joints, shoulder joints, etc. The locations of the stars 210 in image 200, when combined with data regarding the location of the detected user's face, can indicate that the user is holding something in front of their face, in this example a photograph.

Other biometric analysis tasks based on images of a user are known and include drowsiness detection, head pose detection, gaze detection, and emotion detection. Drowsiness detection can determine a user's state of alertness typically by analyzing eyelid position and blink rates. Head pose detection can also determine a user's state of alertness and attention to vehicle operation, typically by analyzing location and orientation of a user's face to detect nodding and slumping postures. Gaze detection can determine the direction in which a user's eyes are looking to determine whether the user is paying attention to vehicle operation. Emotion detection can determine an emotional state of a user, e.g., whether a user is agitated or frightened, to detect possible distractions from vehicle operation.

Figure 3:
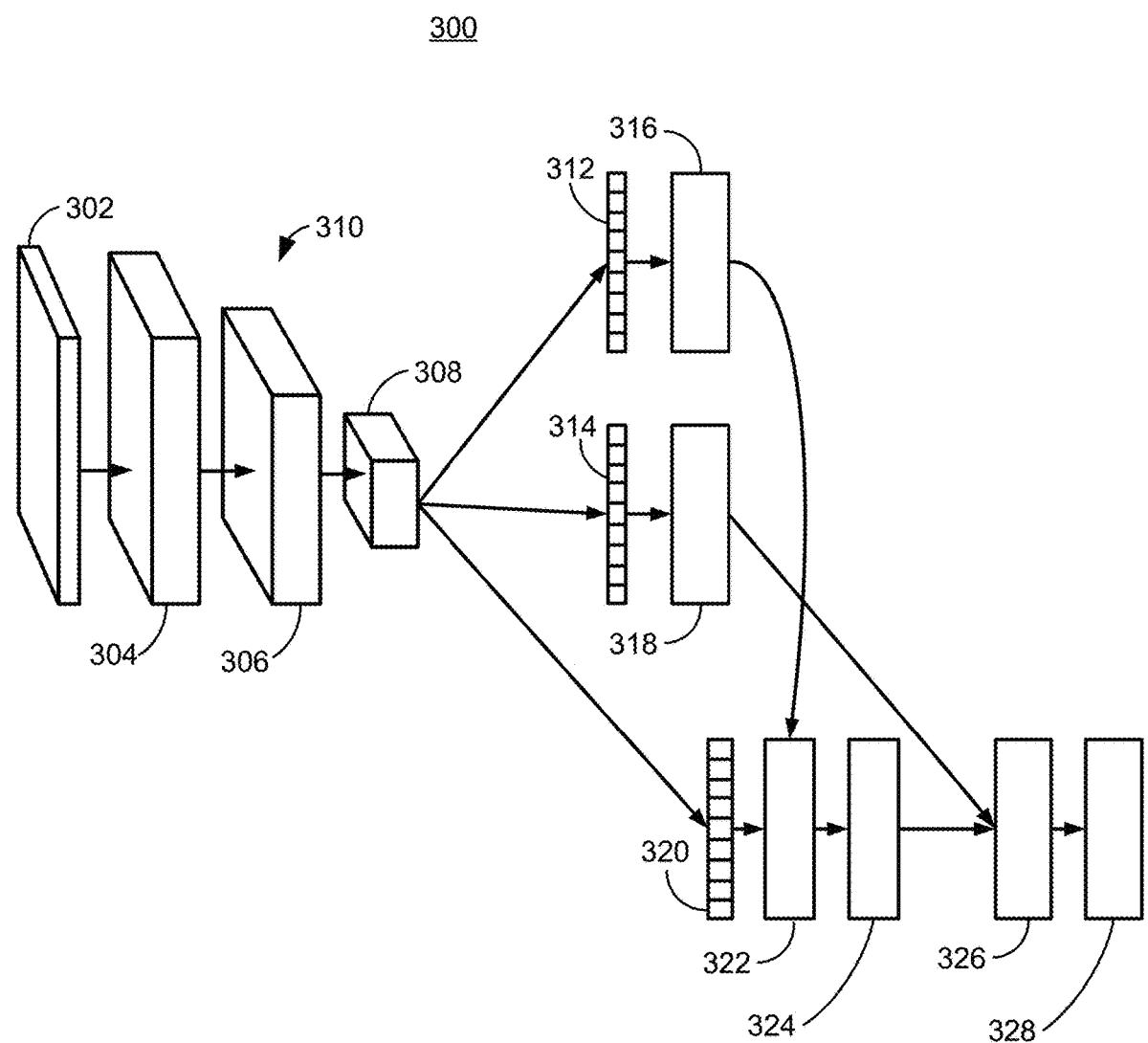
FIG. 3 is a diagram of an example biometric deep neural network including expert pooling.

FIG. 3 is a diagram of a liveliness biometric analysis task system implemented as a deep neural network (DNN) 300. DNN 300 can be implemented in a server computer 120 or computing device 115, for example. DNN 300 has been configured to determine liveliness by combining body pose detection with facial feature detection. The common feature extraction or "backbone" CNN 310 extracts common features from image data and outputs latent variables. Latent variables in the DNN 300 represent common facial and body features output by CNN 310 in response to an input image 302 that includes a human. CNN 310 includes a plurality of convolutional layers 304, 306, 308 that process an image 302 to determine the location of a human face and body components and determine features indicating the location, orientation, and size of human body pose and facial features such as hands, arms, head, eyes, nose, and mouth. CNN 310 can also determine facial features such as skin tone, texture and presence/absence of facial hair, and presence/absence of objects such as glasses and body piercings.

The body and facial features are referred to as common features because they are output as latent variables in common to a plurality of biometric analysis task neural networks including body pose neural network 314, face detection neural network 312, and liveliness neural network 320. Body pose neural network 314, face detection neural network 312, and liveliness neural network 320 include a plurality of fully connected layers that can perform biometric analysis tasks such as body pose detection, face detection, and liveliness. Output from liveliness neural network 320 is passed to a region of interest (ROI) detection neural network 322, then to a texture Biometric analysis task neural networks including body pose neural network 314, face detection neural network 312, and liveliness neural network 320 are trained to output predictions regarding the biometric analysis tasks based on latent variables output from the common feature extraction CNN 310. Predictions output from the biometric analysis tasks include liveliness prediction regarding a user. A liveliness prediction is a probability that the image 302 includes a live user, as opposed to a photograph or mask of a user. A body pose prediction includes estimates of the locations of a user's arms and hands. A face prediction includes a location and pose of a user's face.

DNN 300 can include SoftMax functions 316, 318, 328 on the output of the body pose neural network 314, face detection neural network 312 and liveliness expert pooling neural network 326, respectively. The SoftMax functions 316, 318, 328 are functions that turn a vector of K real values into a vector of K real values between 0 and 1 that sum to 1. Output from the SoftMax functions 316, 318, 328 can be output as results of the biometric analysis tasks or used to calculate loss functions. Processing the outputs of the body pose neural network 314, face detection neural network 312 and liveliness expert pooling neural network 326 with SoftMax functions 316, 318, 328 permits the outputs to be combined into a joint loss function for training the DNN 400. A loss function compares the output from a SoftMax function 316, 318, 328 connected to body pose neural network 314, face detection neural network 312 and liveliness expert pooling neural network 326 with a ground truth value to determine how closely the biometric analysis task neural network has come to determining a correct result. A SoftMax function 316, 318, 328 can limit the output from the body pose neural network 314, face detection neural network 312 and liveliness expert pooling neural network 326 to values between 0 and 1. The SoftMax function 316, 318, 328 can thereby prevent one or more of the outputs from dominating the calculation of a joint loss function due to numerical differences in the outputs. A joint loss function is determined by combining the individual loss functions for each of the body pose neural network 314, face detection neural network 312 and liveliness expert pooling neural network 326 typically by adding the individual loss functions together.

Training a DNN 300 can include determining a training dataset of images 302 and ground truth for each image 302. Determining ground truth can include inspecting the images manually 302 in the training dataset and estimating the correct result to be expected from a SoftMax function 316, 318, 328 connected to a body pose neural network 314, face detection neural network 312, and liveliness expert pooling neural network 326. During training an image 302 can be input to the DNN 300 a plurality of times. Each time the image 302 is input, weights or parameters that control the operation of the convolutional layers 304, 306, 308, of the CNN 310 and the fully connected layers of the body pose neural network 314, face detection neural network 312, ROI detection neural network 322, texture analysis neural network 324, and liveliness expert pooling neural network 326 can be altered and a joint loss function based on the outputs and the ground truth values for each output can be determined. The joint loss function can be backpropagated through the DNN 300 to select the weights for each layer that result in the lowest joint loss which is typically deemed to represent the most correct results. Backpropagation is a process for applying the joint loss function to the weights of the DNN 300 layers starting at the layers closest to the output and progressing back to the layers closest to the input. By processing a plurality of input images 302 including ground truth in the training dataset a plurality of times, a set of weights for the layers of the DNN 300 can be selected that converge on correct results for the entire training dataset the DNN 300 can be determined. Selecting an optimum set of weights in this fashion is referred to as training the DNN 300.

Training the DNN 300 using a joint loss function can advantageously compensate for differences in training datasets for each biometric analysis task. The quality of training for a biometric task can be dependent upon the number of images available with appropriate ground truth for each biometric analysis task. For example, face detection and body pose detection can benefit from the existence of large commercially available datasets that include ground truth. Other biometric analysis tasks, such as determining liveliness, can require that a user acquire image data and estimate ground truth manually. Advantageously, training DNN 300 using a joint loss function determined as discussed herein can permit sharing training datasets between biometric analysis tasks having large training datasets with biometric analysis tasks having smaller training datasets. For example, the individual loss functions can be weighted as they are combined to form a joint loss function to give more weight to loss functions that include larger training datasets.

In examples where one or more of the biometric analysis tasks can have small amounts of ground truth data to include in a training dataset, training the DNN 300 can be enhanced by branch training isolation. For example, a typical training dataset can include 1000's of body pose images with corresponding ground truth while including only a few 100's of images that include liveliness ground truth. Branch training isolation sets the output from a biometric analysis task neural network having no ground truth data for a particular image in a training dataset to a null value. Setting the output from a biometric analysis task neural network to a null value also sets the loss function determined for the biometric analysis task neural network to zero. Branch training isolation also freezes the weights included in the biometric analysis task neural network for that image. This permits the biometric analysis task neural network to be available for joint training along with the rest of the DNN 300 without penalizing biometric analysis tasks with sparse training datasets. For example, drowsiness detection typically has fewer images with ground truth than identification tasks.

DNN 300 combines output from face detection SoftMax function 316 with output from liveliness neural network 320 in a region of interest (ROI) detection neural network 322. ROI detection neural network 322 determines which portions of latent variables output by CNN 310 to process to determine facial features that most likely will determine liveliness. For example, skin tone determined in regions of the user's face that are not covered by facial hair can be output to texture analysis neural network 324. Texture analysis neural network 324 can determine liveliness by processing regions of a human face to determine characteristic textures that the texture analysis neural network 324 has been trained to expect in regions of a human face, for example eyes, mouth, and skin.

The liveliness prediction output from texture analysis neural network 324 is output to liveliness expert pooling neural network 326 where it is combined with a body pose prediction determined by body pose SoftMax function 318. Liveliness expert pooling neural network 326 determines a liveness prediction by inputting a liveness prediction output by texture analysis neural network 324 and combining it with a body pose prediction output by body pose SoftMax function 318. Liveliness expert pooling neural network 326 outputs a liveness prediction to SoftMax function 328. Liveliness expert pooling permits sharing data between biometric analysis tasks like body pose and face detection which can have large training datasets that include ground truth with biometric analysis tasks such as liveliness which can have much smaller training datasets with limited ground truth data. Training a DNN 300 can be enhanced by using liveliness expert pooling neural networks 324 to determine a joint loss function that includes ground truth data from a portion of the biometric analysis tasks included in the training dataset. A joint loss function can be used to train the DNN 300 despite a lack of ground truth data for one or more of the biometric analysis tasks include in the DNN 300.

Techniques discussed herein use a dynamic loss scheme to reduce destructive training interference. Losses are typically normalized to be in a 0 to 1 range based upon loss function complexity using the SoftMax functions. The individual biometric analysis task loss functions can be further weighted based on training importance. Early during the training process input functions such as face detection and body pose detection are prioritized. One the validation accuracy improves for face detection and body pose detection as demonstrated by the joint loss function starting to converge to a minimal value, the individual loss functions can be weighted towards more difficult tasks such as liveliness. Following training, a DNN 300 can be transmitted to a computing device 115 in a vehicle 110 or a server computer 120 included in a traffic infrastructure system 105 to perform biometric analysis tasks on image data acquired by sensors 116, 122 included the vehicle 110 or traffic infrastructure system 105. Operating a trained DNN 300 to determine predictions regarding input data is referred to as inference.

Figure 4:
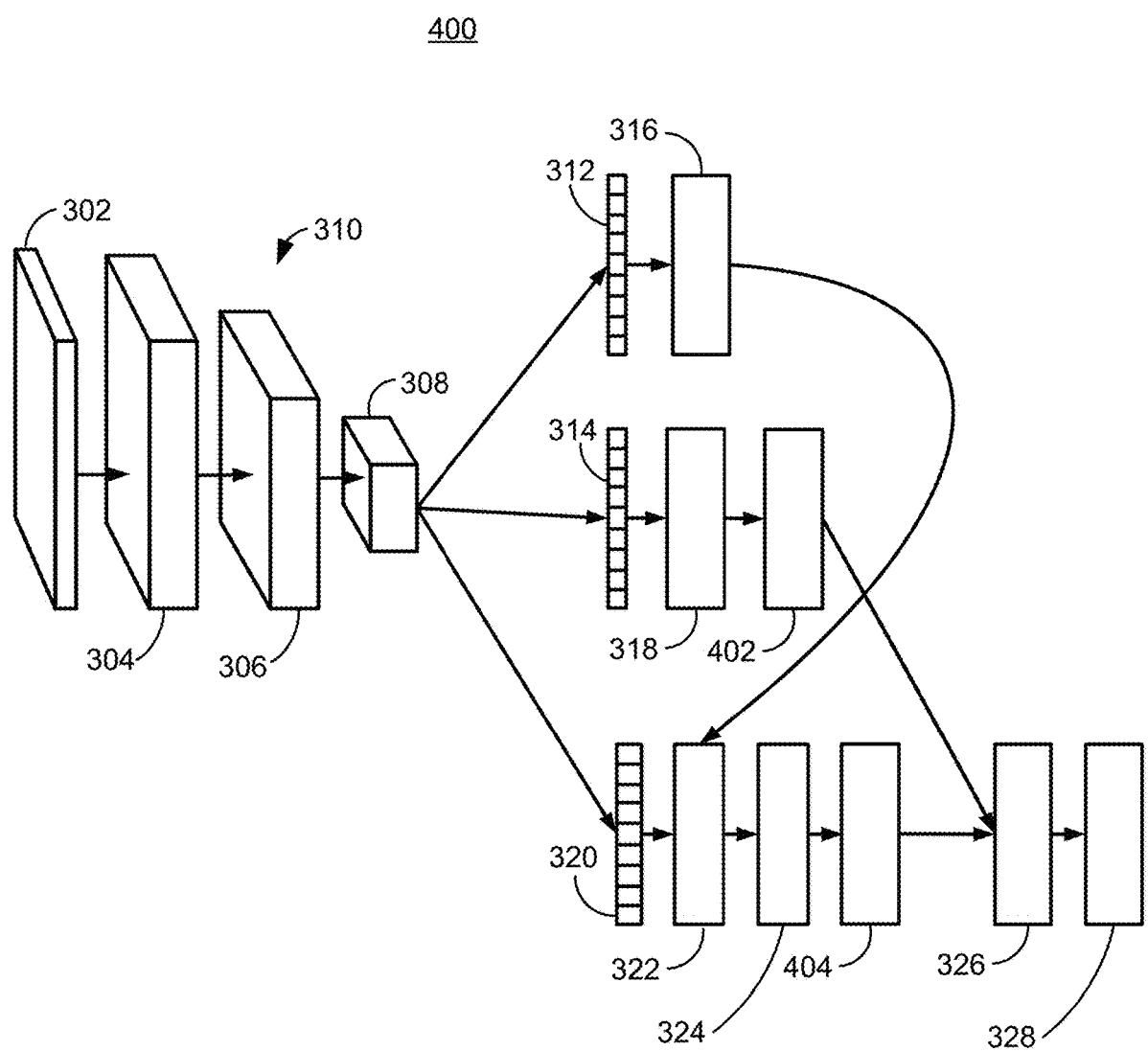
FIG. 4 is a diagram of example multi-task biometric deep neural network including memory.

FIG. 4 is a diagram of a liveliness biometric analysis task system implemented as a deep neural network (DNN) 400. DNN 400 can be implemented in a server computer 120 or computing device 115, for example. DNN 400 includes the same components as included in DNN 300 with the exception of memories 402, 404 added to the body pose neural network 314 data path and the liveliness neural network 320 data path. Memories 402, 404 can store output data from a plurality of input images 302. For example, a plurality of frames of video data from a brief video sequence (about one second of video data) can be input as individual images 302 to DNN 400. Memories 402, 404 can store output results as a 3D stack of temporal data, where the third dimension indicates time. Temporal data can be input to liveliness expert pooling neural network 326 to determine liveliness.

Temporal data can enhance determination of liveliness for use in anti-spoofing systems. Motion metrics indicating changes in body pose, such as how the person is holding up a spoof photograph, or lack of change in the textural variation in a spoofed input image versus an image of a human can be determined using multi-frame analysis. Analysis of the motion metrics can enhance liveliness determination by the liveliness expert pooling neural network 326. Training a DNN 400 to determine motion metrics requires sequential data, i.e., video sequences annotated with ground truth data, which may not be available for all tasks. To accommodate the lack of sequential data, memories 402, 404 are designed to work on both individual images 302 and sequences of image 302. In examples where sequential data is not available, memories 402, 404 pass data through without alteration. In examples where sequential data is available, the sequential data is stored as temporal data and output when the sequence is complete. Processing of temporal data includes queuing of data for multiple frames of input images 302, calculating changes in output data across multiple frames and 3D convolution. For example, liveliness expert pooling neural network 326 can detect a lack of motion in a photograph vs. normal facial motion included in a video sequence of a human face, i.e., blinking and mouth movements.

Examples of DNN 300, 400 can be enhanced by training DNN 300, 400 as illustrated in FIGS. 3 and 4 and then, at inference time, removing body pose neural network 314 from the DNN 300, 400. Output from body pose neural network 314 will still have contributed to training liveliness expert pooling neural network 326 but output from body pose neural network 314 will not be included in liveliness expert pooling neural network 326 at inference time. Determining liveliness without input from body pose neural network 314 via SoftMax function 316 to liveliness expert pooling neural network 326 can provide accurate results at inference time because liveliness was trained using body pose neural network 314 outputs. Removing body pose neural network 314 at inference time can reduce computing resources required to execute DNN 300, 400 while maintaining output accuracy of liveliness predictions.

Figure 5:
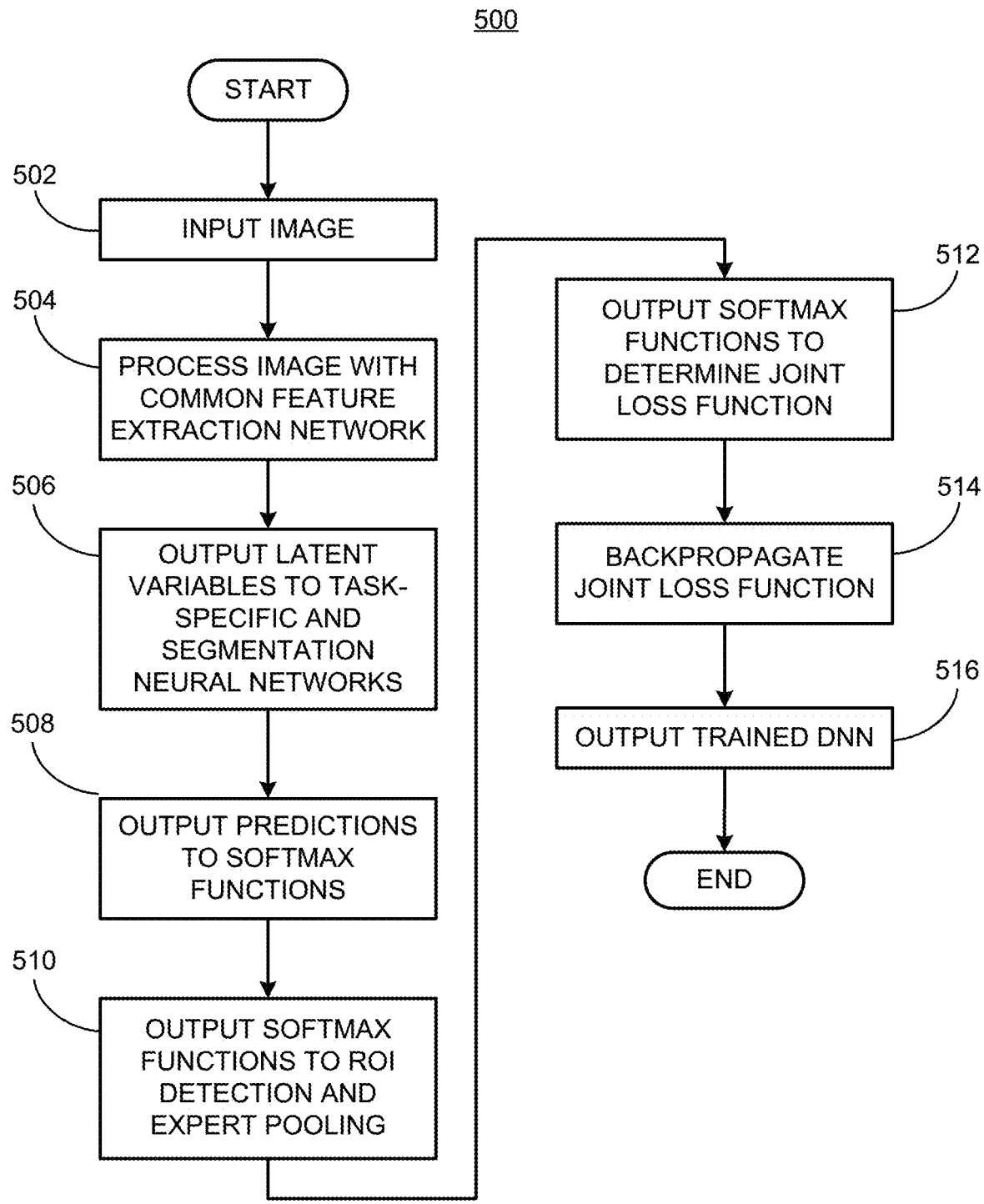
FIG. 5 is a flowchart diagram of an example process to train a deep neural network to perform biometric analysis tasks.

FIG. 5 is a flowchart, described in relation to FIGS. 1-4 of a process 500 for training a DNN 300 including a common feature extraction CNN 310 and a plurality of biometric analysis task neural networks including body pose neural network 314, face detection neural network 312 and liveliness expert pooling neural network 326. Process 500 can be implemented by a processor of a computing device 115 or server computer 120, taking as input image data from sensors 116, 122, executing commands, and outputting biometric analysis task predictions. A DNN 300 is typically executed on a server computer 120 on a traffic infrastructure node 105 at training time and transmitted to a computing device 115 in a vehicle 110 for operation at inference time. Process 500 includes multiple blocks that can be executed in the illustrated order. Process 500 could alternatively or additionally include fewer blocks or can include the blocks executed in different orders.

Process 500 begins at block 502, where an image 302 is acquired from a training dataset. Image 302 includes ground truth for one or more biometric analysis tasks as discussed above in relation to FIG. 3. In examples where ground truth is not available for one or more biometric analysis tasks, the output from the body pose neural network 314, face detection neural network 312, ROI detection neural network 322, texture analysis neural network 324, and liveliness expert pooling neural network 326 can be set to a null value and the weights for the body pose neural network 314, face detection neural network 312, ROI detection neural network 322, texture analysis neural network 324, and liveliness expert pooling neural network 326 can be frozen. Freezing a neural network prevents the weights that program the neural network from being updated based on backpropagating a joint loss function determined at block 510.

At block 504 the image 302 is input to a common feature extraction CNN 310 to determine body and facial features to be output as latent variables as discussed in relation to FIG. 3, above.

At block 506 the latent variables are input to body pose neural network 314, face detection neural network 312, ROI detection neural network 322, texture analysis neural network 324, and liveliness expert pooling neural network 326 which process the latent variables to determine predictions regarding the input image 302 as discussed above in relation to FIG. 4. At inference time the predictions can be output to a computing device 115 to be used to operate a vehicle 110 or other device.

At block 508, at training time, the predictions output from body pose neural network 314 and face detection neural network 312 are input to SoftMax functions 318, 316, respectively to condition the output predictions to be between 0 and 1. Conditioning the output predictions permits the output predictions to be combined into a joint loss function without one or more of the output predictions numerically dominating the calculations.

At block 510 the output from the face detection SoftMax function 316 is input to ROI detection neural network 322 along with output from liveliness neural network 320. Output from ROI detection neural network 322 is passed on to texture analysis neural network 324. Output from texture analysis neural network 324 is combined with output from body pose SoftMax function 318 at liveliness expert pooling neural network 326. Liveliness prediction output from liveliness expert pooling neural network 326 is input to SoftMax function 328 to condition the output prediction to be in the range 0 to 1.

At block 512 the outputs from SoftMax functions 316, 318, 328 are input to individual loss functions and then combined into a joint loss function. As discussed above in relation to FIG. 3, the individual loss functions can be weighted before summing them into the joint loss function depending upon which biometric analysis task they indicate and at what point in the training process it is.

At block 514 the joint loss function can be backpropagated through the layers of the DNN 300 to determine optimal weights for the layers of the DNN 300. Optimal weights are the weights that result in outputs that most closely match the ground truth included in the training dataset. As discussed above in relation to FIG. 3, training DNN 300 includes inputting an input image 302 a plurality of times while varying the weights that program the layers of the DNN 300. Training the DNN 300 includes selecting weights for the layers of DNN 300 that provide the lowest joint loss function for the greatest number of input images 302 in the training dataset.

At block 516 the trained DNN 300 can be output to a computing device 115 in a vehicle 110 or other device for use in determining liveness for input images 302. Following block 616 process 600 ends.

Figure 6:
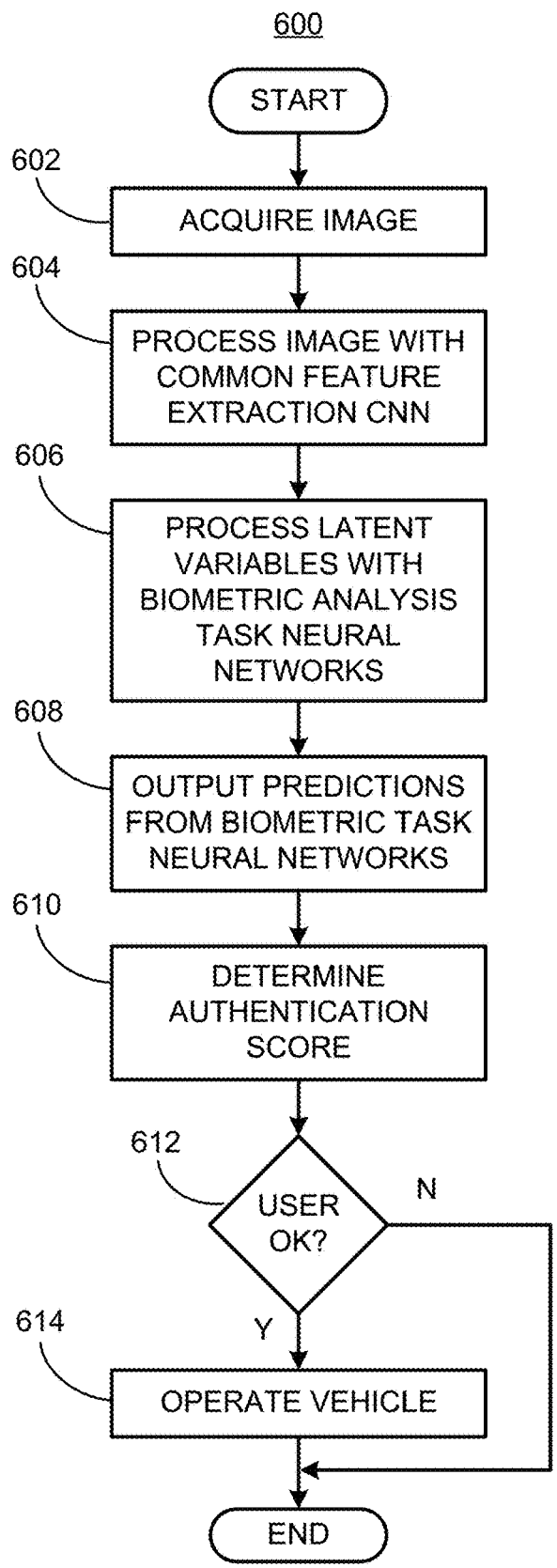
FIG. 6 is a flowchart diagram of an example process to authenticate a user with a deep neural network.

FIG. 6 is a flowchart, described in relation to FIGS. 1-5, of a process 600 for performing a biometric analysis task with a DNN 300 including a common feature extraction CNN 310, and three biometric analysis task neural networks including body pose neural network 314, face detection neural network 312 and liveliness expert pooling neural network 326. Process 600 can be implemented by a processor of a computing device 115 or server computer 120, taking as input image data from sensors 116, 122, executing commands, and outputting biometric analysis task predictions. Process 600 could alternatively or additionally include fewer blocks or can include the blocks executed in different orders.

Following training a DNN 300 as discussed above in relation to FIGS. 3 and 5, the trained DNN 300 can be transmitted to a computing device 115 in a device such as a vehicle 110 for inference. As discussed above in relation to FIGS. 3 and 5, In this example, the DNN 300 will be used for liveliness determination. DNN 300 can be used for liveliness determination for devices other than vehicles 110. Liveliness can be combined with biometric identification, where liveliness can be used to confirm that the biometric identification was performed on an image 302 of a live human as opposed to a photograph of a human face, for example.

Process 600 begins at block 602 where a computing device 115 acquires an image 302 using a sensor 116 such as a camera 204 included in the vehicle 110. The field of view 206 of the camera 204 is configured to provide and image 302 that includes portions of the user's body in addition to the user's face. Process 600 could also be implemented in a security system, a robot guidance system, or a handheld device such as a cell phone that seeks to determine liveliness of a potential user before granting access to a device.

At block 604 the computing device 115 inputs the image 302 to the common feature extraction CNN 310 to determine body and facial features to output as latent variables.

At block 606 the latent variables are input to body pose neural network 314, face detection neural network 312, and liveliness neural network 320 and combined using ROI detection neural network 322, texture analysis neural network 324 and liveliness expert pooling neural network 326 to determine a prediction regarding a probability that input image 302 of the user was acquired from a live human.

At block 608 the predictions regarding biometric identification and liveliness are output from DNN 400 to the computing device 115 in the vehicle 110.

At block 610 the computing device 115 can combine the liveness prediction output from the DNN 300 with an identity prediction determined by a biometric identification system. A biometric identification system can output a prediction that is a probability that an image of a user indicates a user that was used to train the biometric identification system The probabilities indicating biometric identification and the probability of liveliness can be multiplied to determine an overall identification score that reflects the probability the user in the image 302 is an approved user and that the image 302 includes a live human.

At block 612 the computing device 115 tests the authentication score from block 610. If the overall identification score is greater than a user-specified threshold, the user is authenticated and process 600 passes to block 614. The threshold can be determined empirically by testing a plurality of spoofed and real input image 302 to determine the distributions of spoofed and non-spoofed overall identification scores and a threshold that separates the two distributions. If the authentication score is lower than the user-specified threshold the user fails authentication and process 600 ends without authenticating the user.

At block 614 the user has passed authentication and the user is granted permission to operate the vehicle 110. This can include unlocking doors to permit entry to the vehicle 110 and turning on the vehicle 110 controls to permit the user to operate the vehicle 110, granting the user permission to operate various vehicle components, such as climate control, infotainment, etc., to name a few examples. Following block 614 process 600 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a computer that includes a processor and a memory, the memory including instructions executable by the processor to provide a liveliness prediction from a liveliness biometric analysis task that is determined by a deep neural network based on an image provided from an image sensor;
wherein the liveliness biometric analysis task is performed in a deep neural network that includes a common feature extraction neural network and a plurality of task-specific neural networks including a face detection neural network, a body pose neural network, a liveliness neural network, a region of interest (ROI) detection neural network, and a texture analysis neural network to determine the liveliness biometric analysis task by:
inputting the image to the common feature extraction neural network to determine latent variables;
inputting the latent variables to each of the face detection neural network, the body pose neural network, and the liveliness neural network;
inputting output from the face detection neural network to the ROI detection neural network, and further inputting output from the liveliness neural network to the ROI detection neural network;
inputting output from the ROI detection neural network to the texture analysis neural network;
inputting output from the texture analysis neural network and further inputting output from the body pose neural network to a liveliness expert pooling neural network to determine the liveliness prediction; and
outputting the liveliness prediction.

2. The system of claim 1, the instructions including further instructions to train the deep neural network by combining output from the texture analysis neural network and output from the body pose neural network in the liveliness expert pooling neural network to determine the liveliness prediction.

3. The system of claim 1, further comprising a device, wherein the instructions include further instructions to operate the device based on the liveliness prediction output from the deep neural network.

4. The system of claim 3, wherein operating the device based on the liveliness prediction output includes determining user authentication.

5. The system of claim 1, wherein the common feature extraction neural network includes a plurality of convolutional layers.

6. The system of claim 1, wherein the plurality of task-specific neural networks include a plurality of fully connected layers.

7. The system of claim 1, wherein the outputs from the face detection neural network and the body pose neural network are input to SoftMax functions.

8. The system of claim 1, wherein output from the liveliness expert pooling neural network are input to a SoftMax function.

9. The system of claim 1, the instructions including further instructions to train the deep neural network by:
determining first loss functions based on the outputs from the face detection neural network and the body pose neural networks;
determining a second loss function based on outputs from the liveliness expert pooling neural network;
determining a joint loss function based on combining the first loss functions with the second loss function; and
backpropagating the joint loss function back through the deep neural network to determine deep neural network weights.

10. The system of claim 9, wherein the deep neural network is trained by processing a training dataset of images including ground truth a plurality of times and determining weights based on minimizing the joint loss function.

11. The system of claim 1, wherein one or more outputs from the plurality of task-specific neural networks are set to zero during training.

12. A method, comprising:
providing a liveliness prediction output from a liveliness biometric analysis task that is determined by a deep neural network based on an image provided from an image sensor;
wherein the liveliness biometric analysis task is performed in a deep neural network that includes a common feature extraction neural network and a plurality of task-specific neural networks including a face detection neural network, a body pose neural network, a liveliness neural network, a region of interest (ROI) detection neural network, and a texture analysis neural network to determine the liveliness biometric analysis task by:
inputting the image to the common feature extraction neural network to determine latent variables;
inputting the latent variables to each of the face detection neural network, the body pose neural network, and the liveliness neural network;
inputting output from the face detection neural network to the ROI detection neural network, and further inputting output from the liveliness neural network to the ROI detection neural network;
inputting output from the ROI detection neural network to the texture analysis neural network;
inputting output from the texture analysis neural network and further inputting output from the body pose neural network to a liveliness expert pooling neural network to determine the liveliness prediction; and
outputting the liveliness prediction.

13. The method of claim 12, further comprising training the deep neural network by combining output from the texture analysis neural network and output from the body pose neural network in the liveliness expert pooling neural network to determine the liveliness prediction.

14. The method of claim 12, further comprising a device, wherein the device is operated based on the liveliness prediction output from the deep neural network.

15. The method of claim 14, wherein operating the device based on the liveliness prediction output includes determining user authentication.

16. The method of claim 12, wherein the common feature extraction neural network includes a plurality of convolutional layers.

17. The method of claim 12, wherein the plurality of task-specific neural networks include a plurality of fully connected layers.

18. The method of claim 12, wherein the outputs from the face detection neural network and the body pose neural network are input to SoftMax functions.

19. The method of claim 12, wherein output from the liveliness expert pooling neural network are input to a SoftMax function.

20. The method of claim 12, further comprising training the deep neural network by:
- determining first loss functions based on the outputs from the face detection neural network and the body pose neural networks;
- determining a second loss function based on outputs from the liveliness expert pooling neural network;
- determining a joint loss function based on combining the first loss functions with the second loss function; and
- backpropagating the joint loss function back through the deep neural network to determine deep neural network weights.

* * * * *